US012641686B2

(12) United States Patent
Kang et al.

(10) Patent No.: US 12,641,686 B2
(45) Date of Patent: May 26, 2026

(54) INDUCTION HEATING APPARATUS

(71) Applicants: LG ELECTRONICS INC., Seoul (KR); UNIST(ULSAN NATIONAL INSTITUTE OF SCIENCE AND TECHNOLOGY), Ulsan (KR)

(72) Inventors: Kyelyong Kang, Seoul (KR); Gwangrok Kim, Seoul (KR); Jee Hoon Jung, Ulsan (KR); See Hoon Jung, Ulsan (KR); Hwa Pyeong Park, Ulsan (KR)

(73) Assignees: LG ELECTRONICS INC., Seoul (KR); ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 1120 days.

(21) Appl. No.: 17/640,310

(22) PCT Filed: Aug. 11, 2020

(86) PCT No.: PCT/KR2020/010635
§ 371 (c)(1),
(2) Date: Mar. 3, 2022

(87) PCT Pub. No.: WO2021/045402
PCT Pub. Date: Mar. 11, 2021

(65) Prior Publication Data
US 2022/0346196 A1      Oct. 27, 2022

(30) Foreign Application Priority Data
Sep. 5, 2019      (KR) ........................ 10-2019-0110279

(51) Int. Cl.
| | |
|---|---|
| *H05B 6/06* | (2006.01) |
| *H02M 1/42* | (2007.01) |
| *H02M 7/5387* | (2007.01) |

(52) U.S. Cl.
CPC .......... *H05B 6/062* (2013.01); *H02M 1/4225* (2013.01); *H02M 7/5387* (2013.01)

(58) Field of Classification Search
CPC ....... H05B 6/04; H05B 6/062; H05B 2213/05
(Continued)

(56) References Cited

U.S. PATENT DOCUMENTS

| 2003/0164373 A1 | 9/2003 | Hirota et al. | |
| 2011/0192838 A1* | 8/2011 | Fujita ..................... | H05B 6/062 |
| | | | 219/661 |

(Continued)

FOREIGN PATENT DOCUMENTS

| CN | 1816226 A | 8/2006 |
|---|---|---|
| EP | 2066013 A2 | 6/2009 |

(Continued)

*Primary Examiner* — Steven W Crabb
*Assistant Examiner* — Alba T Rosario-Aponte
(74) *Attorney, Agent, or Firm* — Bryan Cave Leighton Paisner LLP

(57) ABSTRACT

An induction heating apparatus according to an embodiment of the present specification comprises a main control circuit for adjusting the capacitance of the variable capacitor circuit according to a driving mode of the inverter circuit determined on the basis of a load resistance value of a container placed on the working coil and adjusting the magnitude of the direct current link voltage according to a final voltage value calculated on the basis of an equivalent resistance value of the container and the working coil and a required power value for the working coil.

15 Claims, 8 Drawing Sheets

(58) Field of Classification Search
USPC ........................................................ 219/620
See application file for complete search history.

(56) References Cited

U.S. PATENT DOCUMENTS

| | | | |
|---|---|---|---|
| 2016/0216662 A1 | 7/2016 | Kosaka | |
| 2018/0177000 A1* | 6/2018 | Son | ........................ H05B 6/12 |
| 2018/0192479 A1* | 7/2018 | Kwack | ................... H05B 6/065 |
| 2020/0323044 A1 | 10/2020 | Kang et al. | |
| 2021/0127461 A1 | 4/2021 | Kwack et al. | |
| 2021/0127463 A1 | 4/2021 | Son et al. | |

FOREIGN PATENT DOCUMENTS

| | | | | |
|---|---|---|---|---|
| EP | 2 170 010 B1 | | 3/2010 | |
| EP | 2 334 142 A1 | | 6/2011 | |
| JP | 2007194006 A | * | 8/2007 | .............. H05B 6/06 |
| JP | 2008010165 A | | 1/2008 | |
| JP | 2008218436 A | * | 9/2008 | ............ H05B 6/062 |
| JP | 2009272268 A | | 11/2009 | |
| JP | 2010080359 A | | 4/2010 | |
| JP | 2011-119057 A | | 6/2011 | |
| JP | 2016042431 A | * | 3/2016 | |
| JP | 6522962 B2 | | 5/2019 | |
| KR | 20180040406 A | * | 4/2018 | |
| KR | 10-2018-0069532 A | | 6/2018 | |
| KR | 10-2019-0040843 A | | 4/2019 | |
| KR | 10-1968553 B1 | | 4/2019 | |

* cited by examiner

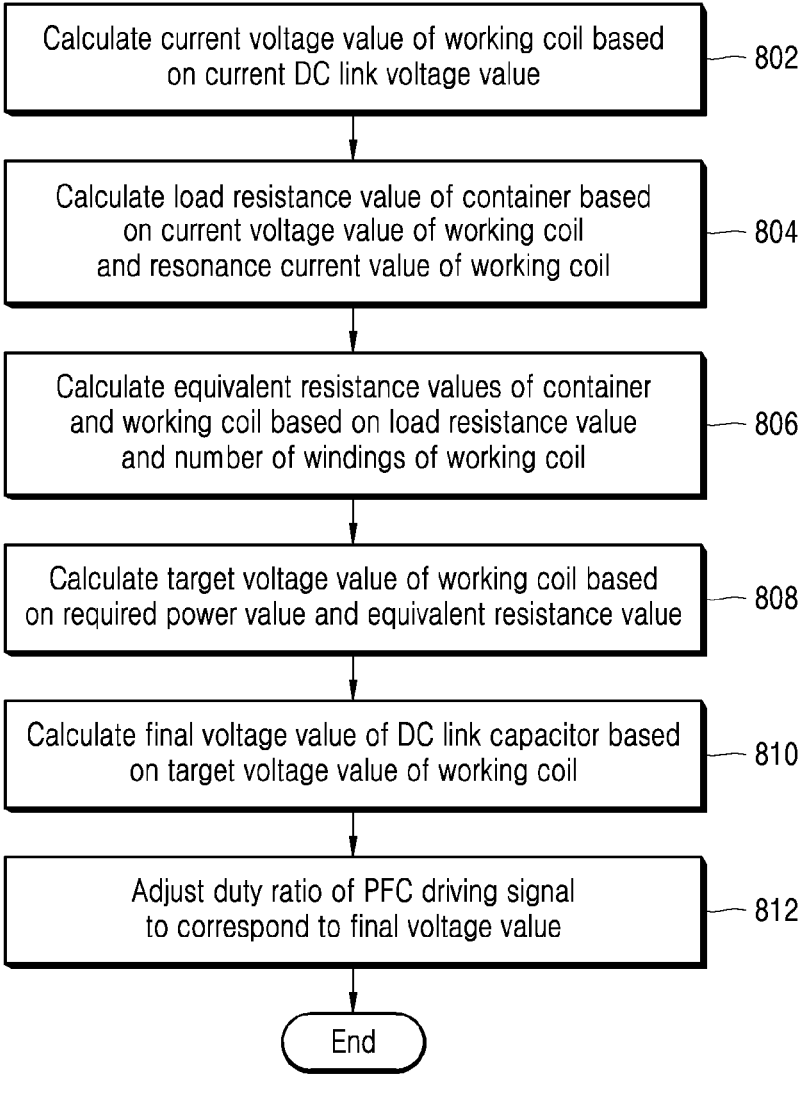

Calculate current voltage value of working coil based on current DC link voltage value — 802

Calculate load resistance value of container based on current voltage value of working coil and resonance current value of working coil — 804

Calculate equivalent resistance values of container and working coil based on load resistance value and number of windings of working coil — 806

Calculate target voltage value of working coil based on required power value and equivalent resistance value — 808

Calculate final voltage value of DC link capacitor based on target voltage value of working coil — 810

Adjust duty ratio of PFC driving signal to correspond to final voltage value — 812

End

FIG. 8

INDUCTION HEATING APPARATUS

This application is a National Stage Application of International Application No. PCT/KR2020/010635, filed on Aug. 11, 2020, which claims the benefit of and priority to Korean Patent Application No. 10-2019-0110279, filed on Sep. 5, 2019, which are hereby incorporated by reference in their entirety for all purposes as if fully set forth herein.

TECHNICAL FIELD

Disclosed herein is an induction heating apparatus.

BACKGROUND ART

Various types of cooking apparatuses are used at homes or restaurants to heat food items. Gas ranges that use gas as a fuel have been widely used as one of the cooking apparatuses. Currently, apparatuses that heat a cooking container by using electric energy are used.

Methods in which a container is heated using electric energy include a resistance heating method and an induction heating method. In terms of the resistance heating method, heat energy is generated when electric current flows in a metallic resistance wire or a non-metallic heat generation element such as silicon carbide, the generated heat energy is delivered to a container, and the container is heated. In terms of the induction heating method, a magnetic field is generated around a working coil when electric energy is supplied to the working coil, eddy current is produced in a container by the magnetic field, and the container is heated.

Induction heating apparatuses include one or more working coils and heat a container using the above-mentioned induction heating method. FIG. 1 is a schematic circuit diagram of an induction heating apparatus of the related art.

Referring to FIG. 1, the induction heating apparatus of the related art includes a rectifier circuit 104, smoothing circuits L, $C_1$, an inverter circuit 106, a working coil 108, a main control circuit 110, and an inverter control circuit 112.

The rectifier circuit 104 rectifies AC input voltage supplied from a power source 102 and outputs voltage having pulsating waveforms.

The smoothing circuits L, $C_{1\ smooth}$ the voltage rectified by the rectifier circuit 104 and output DC link voltage. The smoothing circuits L, $C_1$ include an inductor L and a DC link capacitor $C_1$.

The inverter circuit 106 converts the DC link voltage output from the smoothing circuits L, $C_1$ into AC voltage for driving the working coil 108. The inverter circuit 106 includes a first capacitor $C_2$, a second capacitor $C_3$, a first switching element 120, and a second switching element 122.

The first switching element 120 and the second switching element 122 included in the inverter circuit 106 are alternatively turned on/turned off by a first inverter driving signal $S_1$ and a second inverter driving signal $S_2$ output from the inverter control circuit 112. The first inverter driving signal $S_1$ and the second inverter driving signal $S_2$ are pulse width modulation (PWM) signals that respectively have a predetermined duty ratio. As the first inverter driving signal $S_1$ and the second inverter driving signal $S_2$ are supplied respectively to the first switching element 120 and the second switching element 122, the DC link voltage is converted into AC voltage while the first switching element 120 and the second switching element 122 are alternatively turned on/turned off.

The AC voltage output from the inverter circuit 106 is supplied to the working coil 108. As the AC voltage is supplied, the working coil 108 operates. As the working coil 108 operates, a container placed on the working coil 108 is heated while eddy current flows in the container. Magnitude of thermal energy supplied to the container varies depending on magnitude of power generated by the working coil 108 during the driving of the working coil 108, i.e., an output power value of the working coil.

The main control circuit 110 determines a driving frequency of the inverter circuit 106, and provides a control signal corresponding to the determined driving frequency to the inverter control circuit 112. Thus, the inverter control circuit 112 outputs inverter driving signals $S_1$, $S_2$ having duty ratios corresponding to the driving frequency determined by the main control circuit 110.

A user places a container on the working coil 108 of the induction heating apparatus, and sets a heating level for the container. Based on the heating level set by the user, an output power value required of the working coil 108, i.e., a required power value, is determined. For example, when the user sets the heating level to 5, the required power value of the working coil 108 is determined as 4 kW that is a power value corresponding to heating level 5.

The main control circuit 110 provides a control signal to the inverter control circuit 112 while changing the driving frequency of the inverter circuit 106 until the output power value of the working coil 108 reaches the required power value (e.g., 4 kW). As the output power value of the working coil 108 reaches the required power value, the driving frequency of the inverter circuit 106 is fixed.

However, in the related art, because of characteristics of the elements included in the induction heating apparatus, a range of driving frequencies of the inverter circuit 106 is limited to a specific range. Due to a limited range of driving frequencies, limited sorts of containers can be used for the induction heating apparatus. That is, it is difficult to use containers for the induction heating apparatus of the related art, regardless of materials or characteristics of the containers.

Additionally, in the related art, the driving frequency of the inverter circuit 106 changes until the output power value of the working coil 108 reaches the required power value. However, each time the driving frequency of the inverter circuit 106 changes, conduction loss of the switching elements 120, 122 included in the inverter circuit 106 occurs, and an amount of heat generated in the working coil 108 increases, and impedance of a container, i.e., load impedance, changes. Thus, power efficiency of the working coil 108 decreases, and easy of control over a heating operation of the induction heating apparatus deteriorates.

DESCRIPTION OF INVENTION

Technical Problems

One objective of the present disclosure is to provide an induction heating apparatus where a container made of different materials or having different characteristics can be used.

Another objective of the present disclosure is to provide an induction heating apparatus that can adjust an output power value of a working coil with no need to change a driving frequency of an inverter circuit.

Yet another objective of the present disclosure is to provide an induction heating apparatus that can ensure power efficiency higher than that of an induction heating apparatus of the related art and ease of control over a heating operation.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

An induction heating apparatus of one embodiment includes a rectifier circuit configured to rectify AC input voltage supplied by a power source and outputting the rectified voltage, a PFC circuit configured to be driven by a PFC driving signal and controlling and outputting power factors of the rectified voltage and current, a DC link capacitor configured to smooth voltage output from the PFC circuit and outputting DC link voltage, an inverter circuit including a first switching element, a second switching element, a third switching element, a fourth switching element and a variable capacitor circuit, and being driven by an inverter driving signal and converting the DC link voltage into AC voltage for driving a working coil, and a main control circuit adjusting capacitance of the variable capacitor circuit depending on a driving mode of the inverter circuit determined based on a load resistance value of a container placed on the working coil, and adjusting magnitude of the DC link voltage depending on a final voltage value calculated based on equivalent resistance values of the container and the working coil and a required power value of the working coil.

In one embodiment, the main control circuit calculates a current voltage value of the working coil based on a current DC link voltage value, calculates a load resistance value of the container based on the current voltage value of the working coil and a resonance current value of the working coil, and calculates the equivalent resistance values based on the load resistance value and the number of windings of the working coil.

In one embodiment, the main control circuit calculates a target voltage value of the working coil based on the required power value and the equivalent resistance value, and calculates the final voltage value based on the target voltage value.

In one embodiment, the main control circuit adjusts a duty ratio of the PFC driving signal so that the duty ratio can correspond to the final voltage value.

In one embodiment, the PFC circuit includes a boost inductor, a diode connected in series with the boost inductor, and a boost switching element connected in parallel with a connection point between the boost inductor and the diode.

In one embodiment, the main control circuit compares the load resistance value with a predetermined reference resistance value, and based on results of the comparison, determines a driving mode of the inverter circuit.

In one embodiment, the main control circuit sets the driving mode to a three-fold frequency mode when the load resistance value is less than a first predetermined reference resistance value in a state in which a driving frequency of the inverter circuit is set to a first predetermined driving frequency.

In one embodiment, the main control circuit sets the driving mode to a two-fold frequency mode when the load resistance value is less than a second predetermined reference resistance value in a state in which a driving frequency of the inverter circuit is set to a first predetermined driving frequency.

In one embodiment, the main control circuit sets the driving mode to a half bridge mode when the load resistance value is less than a third predetermined reference resistance value in a state in which a driving frequency of the inverter circuit is set to a third predetermined driving frequency.

In one embodiment, the main control circuit sets the driving mode to a full bridge mode when the load resistance value is greater than or equal to a third predetermined reference resistance value in a state in which a driving frequency of the inverter circuit is set to a third predetermined driving frequency.

In one embodiment, the main control circuit limits an output power value of the working coil to a value that is a predetermined reference power value or less, when the load resistance value is greater than or equal to a fourth predetermined reference resistance value in a state in which the driving mode is set to a full bridge mode.

Advantageous Effects

In an induction heating apparatus according to the present disclosure, a container made of different materials or having different characteristics can be used.

In the induction heating apparatus according to the present disclosure, an output power value of a working coil can be adjusted with no need to change a driving frequency of an inverter circuit.

Unlike an induction heating apparatus of the related art, the induction heating apparatus according to the present disclosure can ensure high power efficiency and ease of control over a heating operation.

BRIEF DESCRIPTION OF DRAWINGS

FIGS. 7 and 8 are flow charts showing a driving process of the induction heating apparatus of one embodiment.

DETAILED DESCRIPTION OF EXEMPLARY EMBODIMENTS

Figure 1:
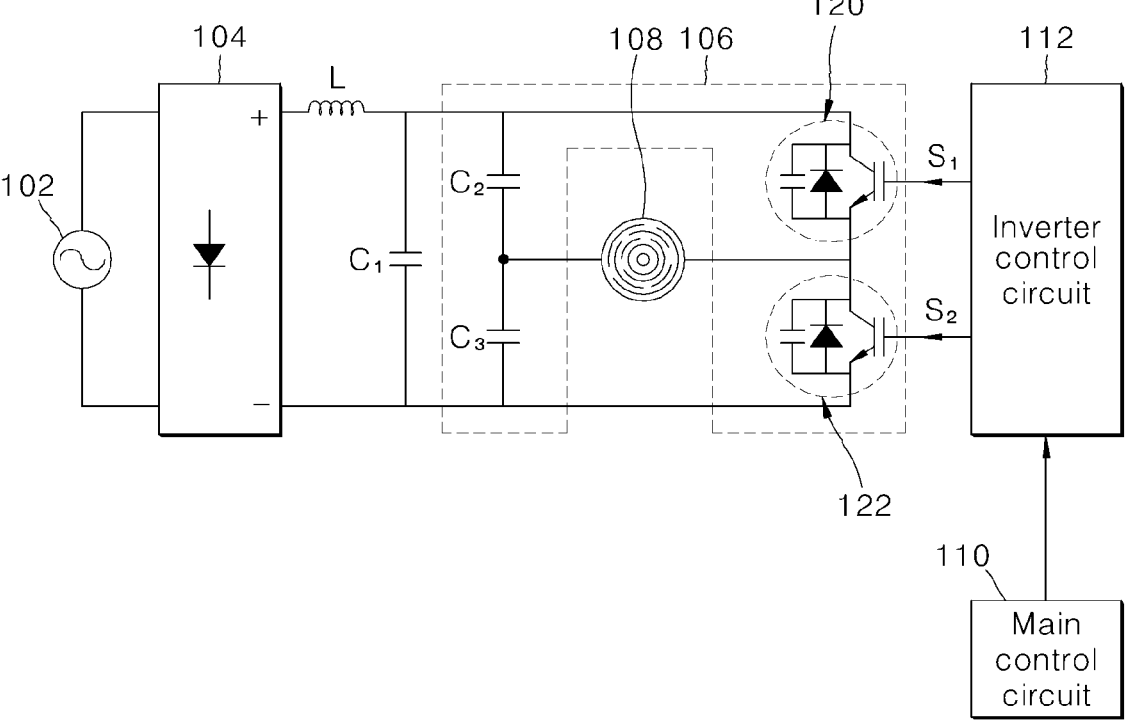
FIG. 1 is a circuit diagram of an induction heating apparatus of the related art.

The above-described aspects, features and advantages are specifically described hereunder with reference to the accompanying drawings so that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

Figure 2:
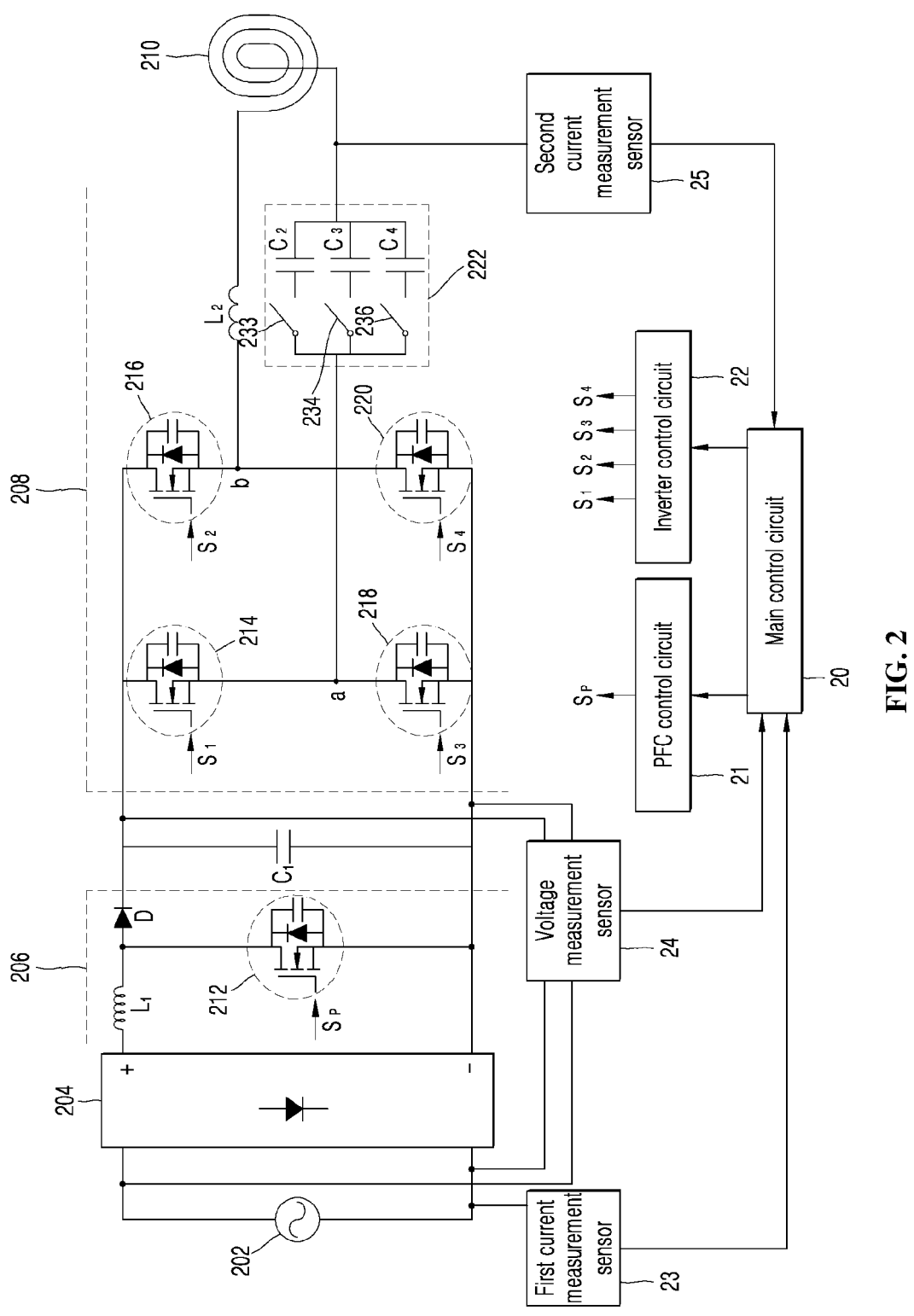
FIG. 2 is a circuit diagram of an induction heating apparatus of one embodiment.

FIG. 2 is a circuit diagram of an induction heating apparatus of one embodiment.

Referring to FIG. 2, the induction heating apparatus of one embodiment includes a rectifier circuit 204, a power factor correction (PFC) circuit 206, an inverter circuit 208, a working coil 210, a main control circuit 20, a PFC control circuit 21, and an inverter control circuit 22.

The rectifier circuit 204 rectifies AC input voltage supplied from a power source 202, and outputs voltage having pulsating waveforms. The rectifier circuit 204 may include one or more diodes.

The PFC circuit 206 controls power factors of rectified voltage and current output from the rectifier circuit 204. That is, the PFC circuit 206 removes harmonic components included in the current output from the rectifier circuit 204, and reduces a phase difference between the current and the voltage that are output from the rectifier circuit 204 and controls the power factors of the rectified voltage and current.

The PFC circuit 206 includes a boost inductor $L_1$, a diode D connected in series with the boost inductor $L_1$, and a boost switching element 212 connected in parallel with a connection point between the boost inductor $L_1$ and the diode D.

The boost switching element 212 is turned on/turned off by a PFC driving signal $S_P$ output from the PFC control circuit 21. The PFC driving signal $S_P$ is a PWM signal having a predetermined duty ratio. As described below, the duty ratio of the PFC driving signal $S_P$ may be adjusted by the main control circuit 20, and the PFC control circuit 21 outputs a PFC driving signal $S_P$ having a duty ratio set by the main control circuit 20.

Magnitude of voltage output from the PFC circuit 206 varies, depending on a duty ratio of the PFC driving signal $S_P$. Additionally, a magnitude of voltage output from a DC link capacitor $C_1$, i.e., DC link voltage, varies depending on magnitude of voltage output from the PFC circuit 206.

Referring back to FIG. 2, the DC link capacitor $C_1$ connected to the PFC circuit 206 smoothes voltage output from the PFC circuit 206 and outputs DC link voltage.

The inverter circuit 208 converts the DC link voltage output from the DC link capacitor $C_1$ into AC voltage for driving the working coil 210. The inverter circuit 208 includes a first switching element 214, a second switching element 216, a third switching element 218, a fourth switching element 220, an inductor $L_2$ and a variable capacitor circuit 222.

The first switching element 214, the second switching element 216, the third switching element 218, and the fourth switching element 220 that are included in the inverter circuit 106 are turned on/turned off alternatively by a first inverter driving signal $S_1$, a second inverter driving signal $S_2$, a third inverter driving signal $S_3$, and a fourth inverter driving signal $S_4$ that are output from an inverter control circuit 112. The first inverter driving signal $S_1$, the second inverter driving signal $S_2$, the third inverter driving signal $S_3$, and the fourth inverter driving signal $S_4$ are respectively a PWM signal having a predetermined duty ratio. As the first inverter driving signal $S_1$, the second inverter driving signal $S_2$, the third inverter driving signal $S_3$, and the fourth inverter driving signal $S_4$ are respectively supplied to the first switching element 214, the second switching element 216, the third switching element 218, and the fourth switching element 220, the first switching element 214 and the second switching element 216 are alternatively turned on/turned off, and the third switching element 218 and the fourth switching element 220 are alternatively turned on/turned off.

In the disclosure, duty ratios or waveforms of the first inverter driving signal $S_1$, the second inverter driving signal $S_2$, the third inverter driving signal $S_3$, and the fourth inverter driving signal $S_4$ may be set differently depending on a driving mode and a driving frequency of the inverter circuit 106. As described below, the main control circuit 20 determines a driving mode of the inverter circuit 106 depending on characteristics of a container, and a driving frequency of the inverter circuit 106 may be set differently depending on a driving mode of the inverter circuit 106.

AC voltage output from the inverter circuit 208 is supplied to the working coil 210. As the AC voltage is supplied to the working coil 210, the working coil 210 operates. As the working coil 210 operates, a container placed on the working coil 210 is heated while eddy current flows in the container. Magnitude of thermal energy supplied to the container varies depending on magnitude of power that is generated by the working coil 210 when the working coil 210 operates, i.e., an output power value of the working coil 210.

The variable capacitor circuit 222 includes a first capacitor $C_2$, a second capacitor $C_3$ and a third capacitor $C_4$ that connect to one another in parallel, and a first switch 233, a second switch 234 and a third switch 236 that connect respectively to the capacitors in series. The first switch 233, the second switch 234 and the third switch 236 can be respectively opened and closed by a control signal of the main control circuit 20. Capacitance of the variable capacitor circuit 222 may vary depending on the opening and closing state of the first switch 233, the second switch 234 and the third switch 236.

FIG. 2 shows that the variable capacitor circuit 222 includes three capacitors, for example. However, the number of capacitors included in the variable capacitor circuit 222 and a circuit structure may vary depending on embodiment.

As AC voltage is supplied to the working coil 210, resonance is induced by capacitors included in the inductor $L_2$ and the variable capacitor circuit 222. As is known, when resonance occurs in an LC circuit, a resonance frequency varies depending on magnitude of inductance and magnitude of capacitance. A main control circuit 110 of the induction heating apparatus according to the present disclosure controls the opening and closing states of the switches 233, 234, 236 included in the variable capacitor circuit 222 to adjust magnitude of capacitance of the variable capacitor circuit 222. As the magnitude of the capacitance of the variable capacitor circuit 222 is adjusted, a resonance frequency of the working coil 210 can be adjusted.

The main control circuit 20 determines a driving mode of the inverter circuit 106, and supplies a control signal corresponding to the determined driving mode to the inverter control circuit 22. The inverter control circuit 22 outputs an inverter driving signal $S_1$, $S_2$, $S_3$, $S_4$ having a duty ratio or a waveform corresponding to the driving mode determined by the main control circuit 110.

As a user places a container on the working coil 210 of the induction heating apparatus and set a heating level for the container, an output power value required of the working coil 210, i.e., a required power value, is determined based on the heating level set by the user. For example, when the user sets the heating level to 5, the required power value of the working coil 210 is determined as 4 kW that is a power value corresponding to heating level 5.

In this case, the container placed on the working coil 210 has different characteristics depending on a material of the container. The main control circuit 20 calculates a resistance value representing the characteristics of the container placed on the working coil 210, i.e., a load resistance value, and based on the calculated load resistance value, determines a driving mode of an inverter circuit 208. As the driving mode of the inverter circuit 208 is determined, a driving frequency of the inverter circuit 208 is determined.

In one embodiment, the main control circuit 20 can calculate a load resistance value, based on an input voltage value measured by a voltage measurement sensor 24 and an input current value measured by a first current measurement sensor 23.

In one embodiment, the main control circuit 20 compares the load resistance value with a predetermined reference resistance value, and based on results of the comparison, determines a driving mode of the inverter circuit 208.

In one embodiment, when the load resistance value is less than a first predetermined reference resistance value in a state in which the driving frequency of the inverter circuit 208 is set to a first predetermined driving frequency, the main control circuit 20 sets the driving mode of the inverter circuit 208 to a three-fold frequency mode.

Additionally, in one embodiment, when the load resistance value is less than a second predetermined reference resistance value in the state in which the driving frequency of the inverter circuit 208 is set to the first predetermined driving frequency, the main control circuit 20 sets the driving mode of the inverter circuit 208 to a two-fold frequency mode.

Further, in one embodiment, when the load resistance value is less than a third predetermined reference resistance value in a state in which the driving frequency of the inverter circuit 208 is set to a third predetermined driving frequency, the main control circuit 20 sets the driving mode of the inverter circuit 208 to a half bridge mode.

Further, in one embodiment, when the load resistance value is greater than or equal to the third predetermined reference resistance value in the state in which the driving frequency of the inverter circuit 208 is set to the third predetermined driving frequency, the main control circuit 20 sets the driving mode of the inverter circuit 208 to a full bridge mode.

Furthermore, in one embodiment, when the load resistance value is greater than or equal to a fourth predetermined reference resistance value in the state in which the driving mode of the inverter circuit 208 is set to the full bridge mode, the main control circuit 20 limits the output power value of the working coil 210 to a value less than a predetermined reference power value.

The main control circuit 20 provides a control signal based on the determined driving mode and driving frequency to the inverter control circuit 22. The inverter control circuit 22 provides inverter driving signals $S_1$, $S_2$, $S_3$, $S_4$ having duty ratios and waveforms corresponding to the driving mode determined by the main control circuit 20 respectively to the switching elements 214, 216, 218, 220.

In the disclosure, since the induction heating apparatus's driving mode appropriate for a container placed on the working coil 210 is determined as described above, a container made of different materials can be used.

When the driving mode is determined and then the inverter circuit 208 operates, the main control circuit 20 adjusts the working coil 210's output power value so that the working coil 210's output power value can reach the working coil 210's required power value corresponding to a heating level set by the user. The main control circuit 20 according to the disclosure adjusts a voltage value of DC link voltage output from the DC link capacitor $C_1$ rather than the inverter circuit 208's driving frequency, to adjust the working coil 210's output power value, unlike that of the related art.

In one embodiment, the main control circuit 20 calculates a final voltage value, based on an equivalent resistance value that is a resistance value at which resistance of a container and resistance of the working coil 210 are added and the required power value of the working coil 210. Based on the calculated final voltage value, the main control circuit 20 adjusts a duty ratio of a PFC driving signal $S_P$ output from the PFC control circuit 21. Accordingly, magnitude of voltage output from the PFC circuit 206 is adjusted, and the voltage value of the DC link voltage is adjusted to the final voltage value. Additionally, since the voltage value of the DC link voltage is adjusted to the final voltage value, the output power value of the working coil 210 reaches the required power value.

In one embodiment, the main control circuit 20 calculates a current voltage value of the working coil 210, based on magnitude of DC link voltage measured by the voltage measurement sensor 24, i.e., a current DC link voltage value. The main control circuit 20 calculates a load resistance value of a container, based on the working coil 210's current voltage value, and based on the working coil 210's resonance current value measured by a second current measurement sensor 25, and calculates an equivalent resistance value, based on the load resistance value and the number of windings of the working coil.

Additionally, in one embodiment, the main control circuit 20 calculates a target voltage value of the working coil 210, based on the required power value and the equivalent resistance value, and calculates a final voltage value, based on the target voltage value.

Further, in one embodiment, the main control circuit 20 adjusts a duty ratio of a PFC driving signal $S_P$ so that the duty ratio of the PFC driving signal can correspond to the final voltage value.

Hereafter, a process of driving the induction heating apparatus of one embodiment is described with reference to FIGS. 2 to 8.

Figure 3:
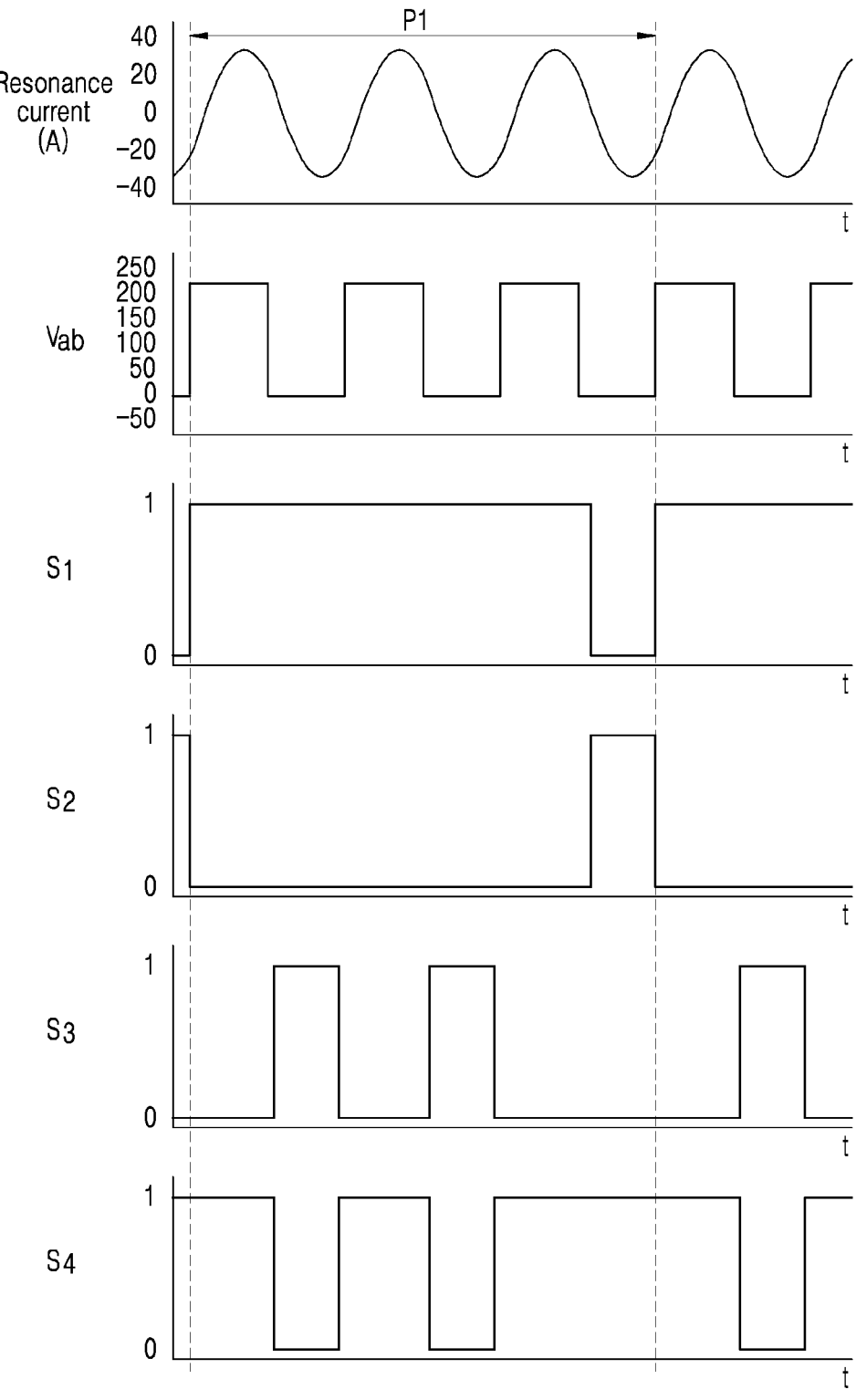
FIG. 3 is a view showing a wave form of resonance current of a working coil, a waveform of bridge voltage, and waveforms of inverter driving signals when the induction heating apparatus of one embodiment operates in a three-fold frequency mode.
Figure 4:
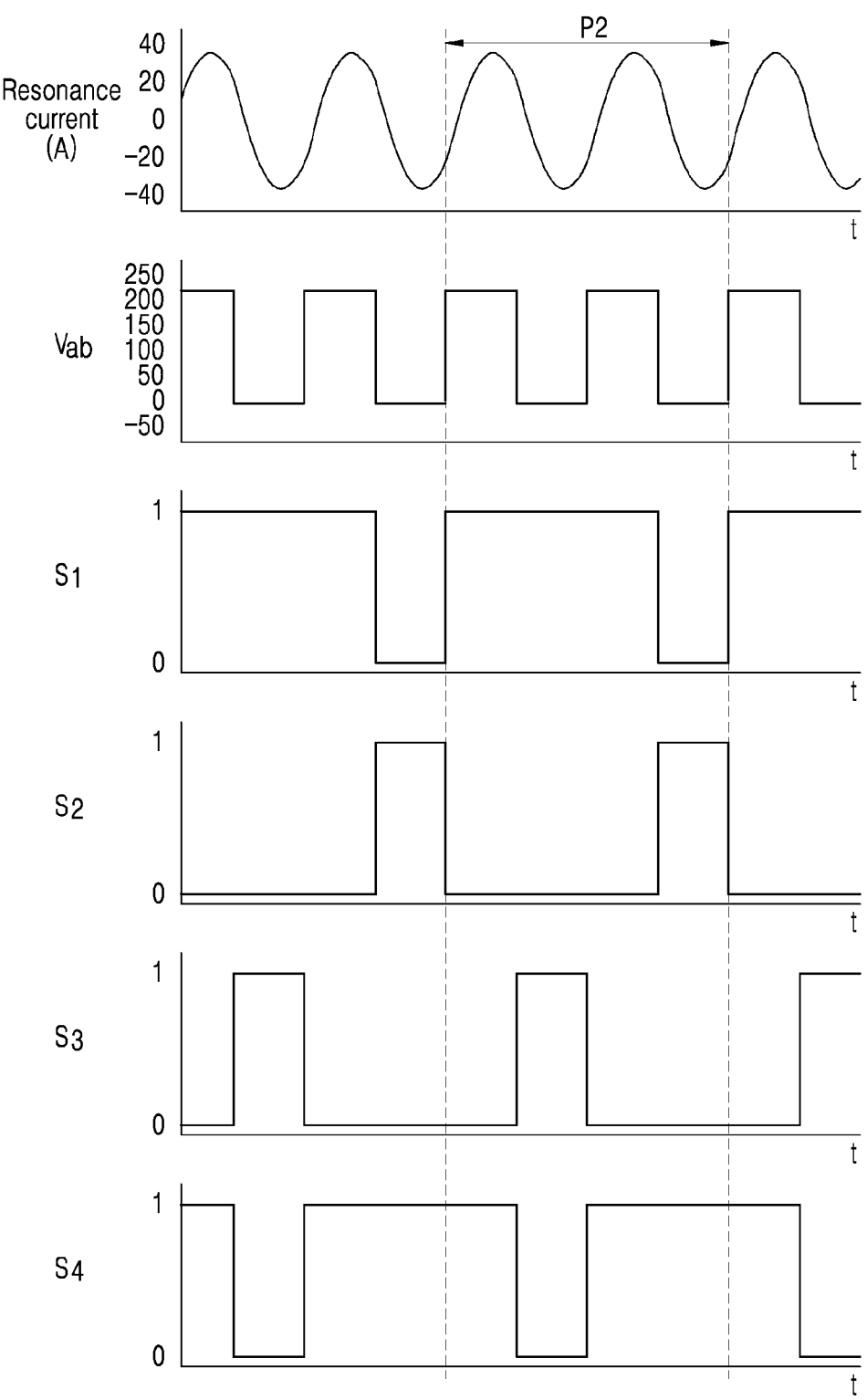
FIG. 4 is a view showing a waveform of resonance current of a working coil, a waveform of bridge voltage, and waveforms of inverter driving signals when the induction heating apparatus of one embodiment operates in a two-fold frequency mode.
Figure 5:
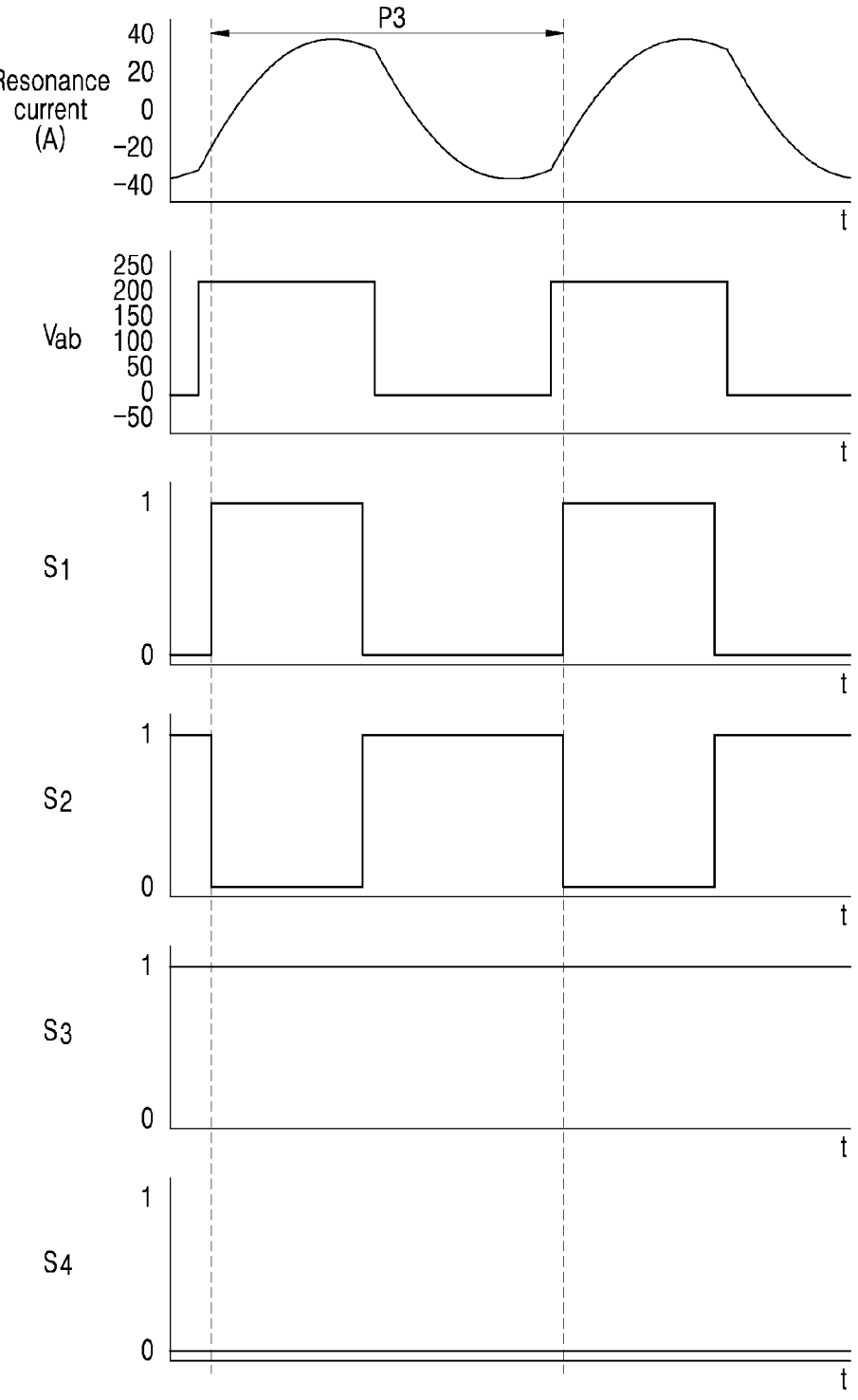
FIG. 5 is a view showing a waveform of resonance current of a working coil, a waveform of bridge voltage, and waveforms of inverter driving signals when the induction heating apparatus of one embodiment operates in a half bridge mode.
Figure 6:
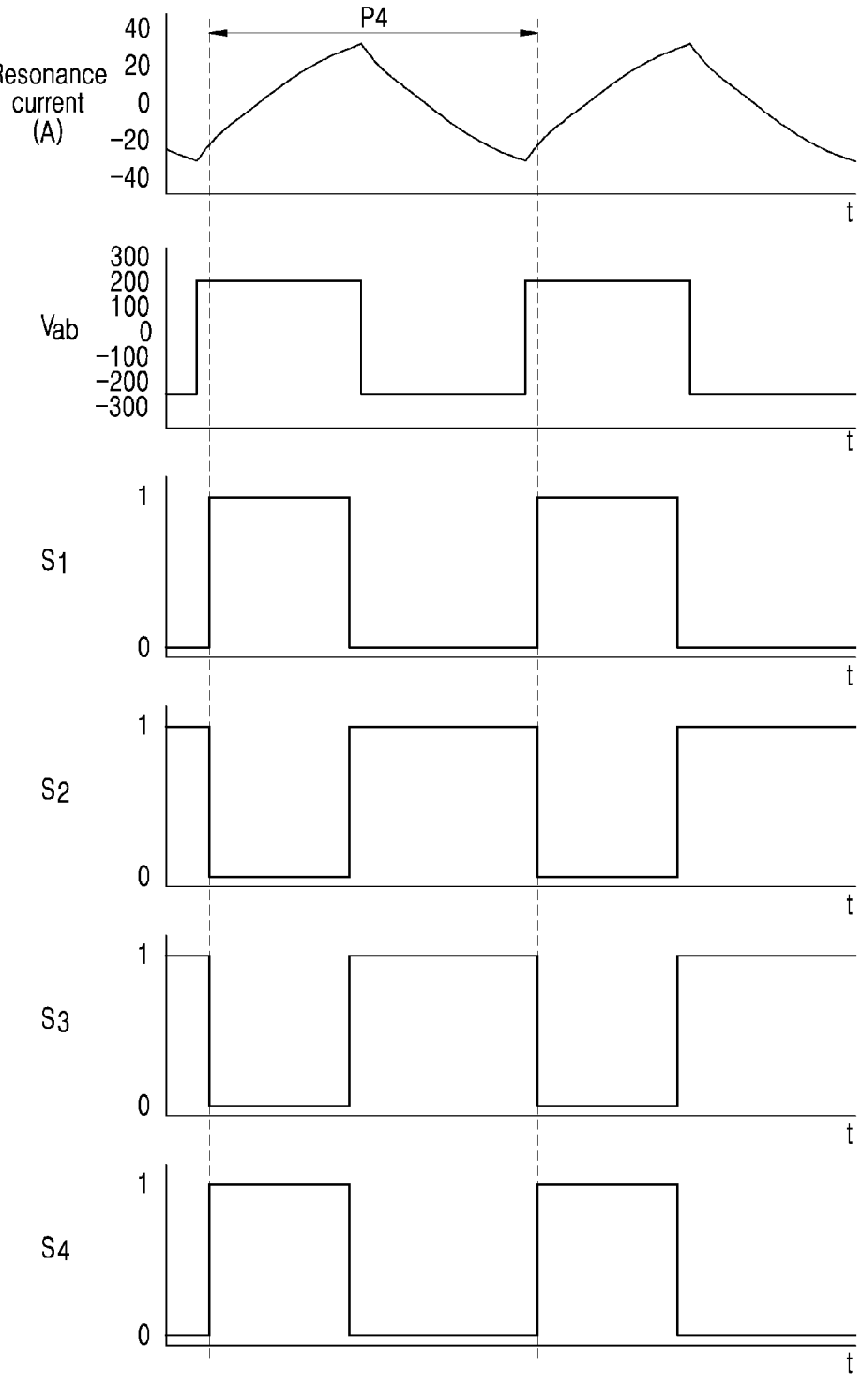
FIG. 6 is a view showing a waveform of resonance current of a working coil, a waveform of bridge voltage, and waveforms of inverter driving signals when the induction heating apparatus of one embodiment operates in a full bridge mode.
Figure 7:
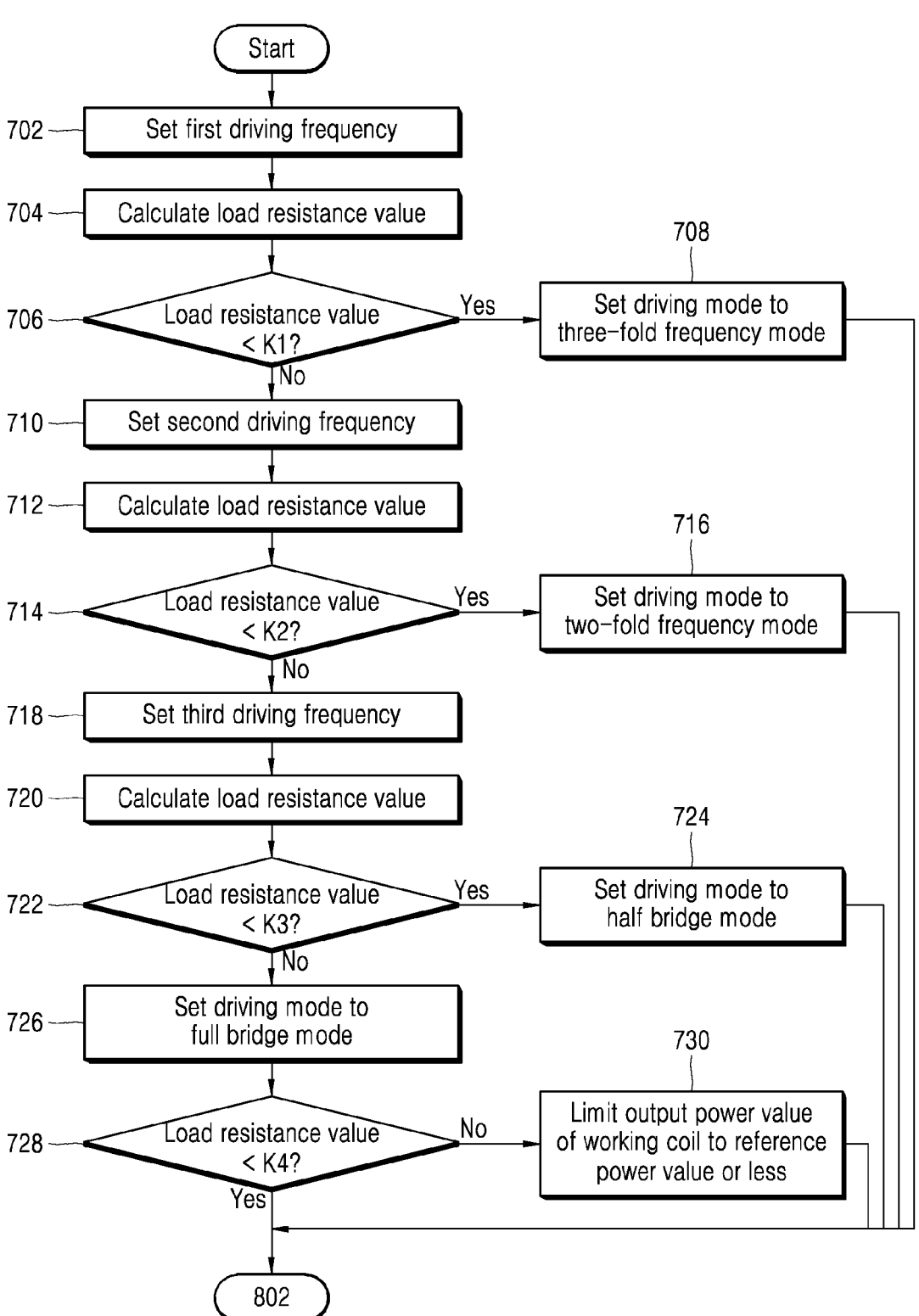

FIG. 3 is a view showing a waveform of resonance current of a working coil, a waveform of bridge voltage, and waveforms of inverter driving signals when the induction heating apparatus of one embodiment operates in a three-fold frequency mode. FIG. 4 is a view showing a waveform of resonance current of a working coil, a waveform of bridge voltage, and waveforms of inverter driving signals when the induction heating apparatus of one embodiment operates in a two-fold frequency mode. FIG. 5 is a view showing a waveform of resonance current of a working coil, a waveform of bridge voltage, and waveforms of inverter driving signals when the induction heating apparatus of one embodiment operates in a half bridge mode. FIG. 6 is a view showing a waveform of resonance current of a working coil, a waveform of bridge voltage, and waveforms of inverter driving signals when the induction heating apparatus of one embodiment operates in a full bridge mode. FIGS. 7 and 8 are flow charts showing a process of driving the induction heating apparatus of one embodiment.

Referring to FIG. 7, as the user sets a heating level and then performance of a heating operation is requested in a state in which a container is placed on the working coil 210, the main control circuit 20 sets a driving frequency of the inverter circuit 208 to the first predetermined driving frequency (702).

In one embodiment, the first driving frequency may be set to a frequency three times greater than a minimum frequency $f_{min}$ of the inverter circuit 208, i.e., $3 \times f_{min}$. The inverter circuit 208's minimum frequency $f_{min}$ denotes the inverter circuit 208's driving frequency when the working coil 210's output power value is a minimum value.

The main control circuit 20 sets the driving frequency of the inverter circuit 208 to the first driving frequency, and provides a control signal corresponding to the first driving frequency to the inverter control circuit 22. Having received the control signal, the inverter control circuit 22 provides a first inverter driving signal $S_1$, a second inverter driving signal $S_2$, a third inverter driving signal $S_3$, and a fourth inverter driving signal $S_4$ that have a duty ratio corresponding to the first driving frequency, respectively to the first switching element 214, the second switching element 216, the third switching element 218 and the fourth switching element 220.

As the inverter circuit 208 is driven by the inverter driving signals and then AC voltage is supplied to the working coil 210, the main control circuit 20 calculates a resistance value, i.e., a load resistance value, of the container, using an input voltage value measured by the voltage measurement sensor 24 and an input current value measured by the first current measurement sensor 23 (704).

For example, the main control circuit 20 may calculate the load resistance value R, using Equation $R=(G \times V^2)/P$. Herein, P denotes an input power value and is calculated by multiplying the input voltage value V by the input current value I. Additionally, G denotes a predetermined voltage gain value. Depending on embodiments, the load resistance value may be calculated, using another method, based on the input voltage value measure by the voltage measurement sensor 24 and the input current value measured by the first current measurement sensor 23.

The main control circuit 20 compares the calculated load resistance value with a first predetermined reference resistance value K1 (706). In one embodiment, the first reference resistance value K1 may be set to be the same as $R_{pot,t,max}$ in [Equation 1] described hereunder.

$$R_{pot,t,max} = \frac{G_{max} \cdot V_{in}^2}{4P_{rated}} \qquad \text{[Equation 1]}$$

In [Equation 1], Gmax denotes a maximum voltage gain value among ratios of output voltages of the inverter circuit 208 to input voltages of the inverter circuit 208, i.e., voltage gain values. The maximum voltage gain value may be replaced with a value acquired through an experiment or a previously calculated value.

Additionally, Vin denotes an input voltage value measured by the voltage measurement sensor 24. Further, Prated denotes maximum rated power of the induction heating apparatus.

When the calculated load resistance value is less the first reference resistance value K1 as a result of the comparison between the load resistance value and the first reference resistance value K1, the main control circuit 20 sets the driving mode of the inverter circuit 208 to a three-fold frequency mode (708). The main control circuit 20 performs step 802 described below after completion of the setting of the driving mode.

FIG. 3 shows a wave form of resonance current of the working coil 210, measured by the second current measurement sensor 25, a waveform of bridge voltage $V_{ab}$ that is voltage supplied between an output terminal a and an output terminal b, and waveforms of a first inverter driving signal $S_1$, a second inverter driving signal $S_2$, a third inverter driving signal $S_3$ and a fourth inverter driving signal $S_4$ when the driving mode of the inverter circuit 208 of one embodiment is a three-fold frequency mode.

As the driving mode of the induction heating apparatus is determined as the three-fold frequency mode as described above, the main control circuit 20 supplies a control signal to the inverter control circuit 22 such that the inverter control circuit 22 outputs the first inverter driving signal $S_1$, the second inverter driving signal $S_2$, the third inverter driving signal $S_3$ and the fourth inverter driving signal $S_4$ that have the duty ratios and waveforms illustrated in FIG. 3.

Herein, the main control circuit 20 sets the resonance current to be output three times for a single period P1 of the first inverter driving signal $S_1$, the second inverter driving signal $S_2$, the third inverter driving signal $S_3$ and the fourth inverter driving signal $S_4$, as illustrated in FIG. 3. In other words, the main control circuit 20 sets the resonance frequency of the working coil 210 to a frequency three times greater than the driving frequency of the inverter circuit 210. To this end, the main control circuit 20 adjusts the opening and closing states of the switches 233, 234, 236 so that capacitance Cr,t of the variable capacitor circuit 222 can be the same as [Equation 2] described hereunder.

$$C_{r,t} = \frac{1}{(2\pi f_{r,t})^2 L_r} \qquad \text{[Equation 2]}$$

In [Equation 2], fr,t denotes a frequency value that is three times greater than the driving frequency of the inverter circuit 208, and Lr denotes inductance of the inductor $L_2$.

Depending on the adjustment of the opening and closing states of the switches 233, 234, 236 of the variable capacitor circuit 222, the capacitance of the variable capacitor circuit 222 is adjusted to be the same as [Equation 2], and as the first inverter driving signal $S_1$, the second inverter driving signal $S_2$, the third inverter driving signal $S_3$ and the fourth inverter driving signal $S_4$, illustrated in FIG. 2, are provided to the inverter circuit 208, the inverter circuit 208 operates in the three-fold frequency mode.

Referring back to FIG. 7, when the calculated load resistance value is greater than or equal to the first reference resistance value K1 as a result of the comparison between the load resistance value and the first reference resistance value K1, the main control circuit 20 sets the driving frequency of the inverter circuit 208 to a second predetermined driving frequency (710). In one embodiment, the second driving frequency may be set to a frequency two times greater than the minimum frequency $f_{min}$, i.e., $2 \times f_{min}$.

The main control circuit 20 provides a control signal corresponding to the second driving frequency to the inverter control circuit 22 in the state in the driving frequency of the inverter circuit 208 is set to the second driving frequency. Having received the control signal, the inverter control circuit 22 provides a first inverter driving signal $S_1$, a second inverter driving signal $S_2$, a third inverter driving signal $S_3$, and a fourth inverter driving signal $S_4$ that have a duty ratio corresponding to the second driving frequency, respectively to the first switching element 214, the second switching element 216, the third switching element 218 and the fourth switching element 220.

As the inverter circuit 208 is driven by the inverter driving signals and then AC voltage is supplied to the working coil 210, the main control circuit 20 calculates a resistance value, i.e., a load resistance value, of the container, using an input voltage value measured by the voltage measurement sensor 24 and an input current value measured by the first current measurement sensor 23 (712).

The main control circuit 20 compares the calculated load resistance value with a second predetermined reference resistance value K2 (714). In one embodiment, the second reference resistance value K2 may be set to be the same as Rpot,d,max in [Equation 3] described hereunder.

$$R_{pot,d,max} = \frac{G_{max} \cdot V_{in}^2}{4P_{rated}} \qquad \text{[Equation 3]}$$

When the calculated load resistance value is less the second reference resistance value K2 as a result of the comparison between the load resistance value and the second reference resistance value K2, the main control circuit 20 sets the driving mode of the inverter circuit 208 to a two-fold frequency mode (716). The main control circuit 20 performs step 802 described below after completion of the setting of the driving mode.

FIG. 4 shows a wave form of resonance current of the working coil 210, measured by the second current measurement sensor 25, a waveform of bridge voltage $V_{ab}$ that is voltage supplied between the output terminal a and the output terminal b, and waveforms of a first inverter driving signal $S_1$, a second inverter driving signal $S_2$, a third inverter driving signal $S_3$ and a fourth inverter driving signal $S_4$ when the driving mode of the inverter circuit 208 of one embodiment is a two-fold frequency mode.

As the driving mode of the induction heating apparatus is determined as the two-fold frequency mode as described above, the main control circuit 20 supplies a control signal to the inverter control circuit 22 such that the inverter control circuit 22 outputs the first inverter driving signal $S_1$, the second inverter driving signal $S_2$, the third inverter driving signal $S_3$ and the fourth inverter driving signal $S_4$ that have the duty ratios and waveforms illustrated in FIG. 4.

Herein, the main control circuit 20 sets the resonance current to be output two times for a single period P1 of the first inverter driving signal $S_1$, the second inverter driving signal $S_2$, the third inverter driving signal $S_3$ and the fourth inverter driving signal $S_4$, as illustrated in FIG. 4. In other words, the main control circuit 20 sets the resonance frequency of the working coil 210 to a frequency two times greater than the driving frequency of the inverter circuit 210. To this end, the main control circuit 20 adjusts the opening and closing states of the switches 233, 234, 236 so that capacitance Cr,d of the variable capacitor circuit 222 can be the same as [Equation 4] described hereunder.

$$C_{r,d} = \frac{1}{(2\pi f_{r,d})^2 L_r} \qquad \text{[Equation 4]}$$

In [Equation 4], fr,d denotes a frequency value that is two times greater than the driving frequency of the inverter circuit 208.

Depending on the adjustment of the opening and closing states of the switches 233, 234, 236 of the variable capacitor circuit 222, the capacitance of the variable capacitor circuit 222 is adjusted to be the same as [Equation 4], and as the first inverter driving signal $S_1$, the second inverter driving signal $S_2$, the third inverter driving signal $S_3$ and the fourth inverter driving signal $S_4$, illustrated in FIG. 4, are provided to the inverter circuit 208, the inverter circuit 208 operates in the two-fold frequency mode.

Referring back to FIG. 7, when the calculated load resistance value is greater than or equal to the second reference resistance value K2 as a result of the comparison between the load resistance value and the second reference resistance value K2, the main control circuit 20 sets the driving frequency of the inverter circuit 208 to a third predetermined driving frequency (718). In one embodiment, the third driving frequency may be set to the minimum frequency $f_{min}$.

The main control circuit 20 provides a control signal corresponding to the third driving frequency to the inverter control circuit 22 in the state in the driving frequency of the inverter circuit 208 is set to the third driving frequency. Having received the control signal, the inverter control circuit 22 provides a first inverter driving signal $S_1$, a second inverter driving signal $S_2$, a third inverter driving signal $S_3$, and a fourth inverter driving signal $S_4$ that have a duty ratio corresponding to the third driving frequency, respectively to the first switching element 214, the second switching element 216, the third switching element 218 and the fourth switching element 220.

As the inverter circuit 208 is driven by the inverter driving signals and then AC voltage is supplied to the working coil 210, the main control circuit 20 calculates a resistance value, i.e., a load resistance value, of the container, using an input voltage value measured by the voltage measurement sensor 24 and an input current value measured by the first current measurement sensor 23 (720).

The main control circuit 20 compares the calculated load resistance value with a third predetermined reference resistance value K3. In one embodiment, the third reference resistance value K3 may be set to be the same as Rpot,h,max in [Equation 5] described hereunder.

$$R_{pot,h,max} = \frac{G_{max} \cdot V_{in}^2}{4P_{rated}} \qquad \text{[Equation 5]}$$

When the calculated load resistance value is less the third reference resistance value K3 as a result of the comparison between the load resistance value and the third reference resistance value K3, the main control circuit 20 sets the driving mode of the inverter circuit 208 to a half bridge mode (724). The main control circuit 20 performs step 802 described below after completion of the setting of the driving mode.

FIG. 5 shows a wave form of resonance current of the working coil 210, measured by the second current measurement sensor 25, a waveform of bridge voltage $V_{ab}$ that is voltage supplied between the output terminal a and the output terminal b, and waveforms of a first inverter driving signal $S_1$, a second inverter driving signal $S_2$, a third inverter driving signal $S_3$ and a fourth inverter driving signal $S_4$ when the driving mode of the inverter circuit 208 of one embodiment is a half bridge mode.

As the driving mode of the inverter circuit 208 is determined as the half bridge mode as described above, the main control circuit 20 supplies a control signal to the inverter control circuit 22 such that the inverter control circuit 22 outputs the first inverter driving signal $S_1$, the second inverter driving signal $S_2$, the third inverter driving signal $S_3$ and the fourth inverter driving signal $S_4$ that have the duty ratios and waveforms illustrated in FIG. 5.

Herein, the main control circuit 20 sets the resonance current to be output once for a single period P1 of the first inverter driving signal $S_1$, the second inverter driving signal $S_2$, the third inverter driving signal $S_3$ and the fourth inverter driving signal $S_4$, as illustrated in FIG. 5. In other words, the main control circuit 20 sets the resonance frequency of the working coil 210 to a frequency the same as the driving frequency of the inverter circuit 210. To this end, the main control circuit 20 adjusts the opening and closing states of the switches 233, 234, 236 so that capacitance Cr,h of the variable capacitor circuit 222 can be the same as [Equation 6] described hereunder.

$$C_{r,h} = \frac{1}{(2\pi f_{r,h})^2 L_r} \qquad \text{[Equation 6]}$$

In [Equation 6], fr,h denotes a frequency value that is the same as the driving frequency of the inverter circuit 210.

Depending on the adjustment of the opening and closing states of the switches 233, 234, 236 of the variable capacitor circuit 222, the capacitance of the variable capacitor circuit 222 is adjusted to be the same as [Equation 6], and as the first inverter driving signal $S_1$, the second inverter driving signal $S_2$, the third inverter driving signal $S_3$ and the fourth inverter driving signal $S_4$, illustrated in FIG. 5, are provided to the inverter circuit 208, the inverter circuit 208 operates in the half bridge mode.

Referring back to FIG. 7, when the calculated load resistance value is greater than or equal to the third reference resistance value K3 as a result of the comparison between the load resistance value and the third reference resistance value K3, the main control circuit 20 sets the driving mode to a full bride mode (726). The main control circuit 20 performs step 802 described below after completion of the setting of the driving mode.

FIG. 6 shows a wave form of resonance current of the working coil 210, measured by the second current measurement sensor 25, a waveform of bridge voltage $V_{ab}$ that is voltage supplied between the output terminal a and the output terminal b, and waveforms of a first inverter driving signal $S_1$, a second inverter driving signal $S_2$, a third inverter driving signal $S_3$ and a fourth inverter driving signal $S_4$ when the driving mode of the inverter circuit 208 of one embodiment is a full bridge mode.

As the driving mode of the inverter circuit 208 is determined as the full bridge mode as described above, the main control circuit 20 supplies a control signal to the inverter control circuit 22 such that the inverter control circuit 22 outputs the first inverter driving signal $S_1$, the second inverter driving signal $S_2$, the third inverter driving signal $S_3$ and the fourth inverter driving signal $S_4$ that have the duty ratios and waveforms illustrated in FIG. 6.

Herein, the main control circuit 20 sets the resonance current to be output once for a single period P1 of the first inverter driving signal $S_1$, the second inverter driving signal $S_2$, the third inverter driving signal $S_3$ and the fourth inverter driving signal $S_4$, as illustrated in FIG. 5. In other words, the main control circuit 20 sets the resonance frequency of the working coil 210 to a frequency the same as the driving frequency of the inverter circuit 210. To this end, the main control circuit 20 adjusts the opening and closing states of the switches 233, 234, 236 so that capacitance Cr,f of the variable capacitor circuit 222 can be the same as [Equation 8] described hereunder.

$$C_{r,f} = \frac{1}{(2\pi f_{r,f})^2 L_r} \qquad \text{[Equation 7]}$$

In [Equation 7], fr,f denotes a frequency value that the same as the driving frequency of the inverter circuit 210.

Depending on the adjustment of the opening and closing states of the switches 233, 234, 236 of the variable capacitor circuit 222, the capacitance of the variable capacitor circuit 222 is adjusted to be the same as [Equation 8], and as the first inverter driving signal $S_1$, the second inverter driving signal $S_2$, the third inverter driving signal $S_3$ and the fourth inverter driving signal $S_4$, illustrated in FIG. 6, are provided to the inverter circuit 208, the inverter circuit 208 operates in the full bridge mode.

Then the main control circuit 20 calculates a load resistance value again, and compares the calculated load resistance value with a fourth predetermined reference resistance value K4. In one embodiment, the fourth reference resistance value K4 may be set to be the same as Rpot,f,max in [Equation 8] described hereunder.

$$R_{pot,f,max} = \frac{G_{max} \cdot V_{in}^2}{P_{rated}} \qquad \text{[Equation 8]}$$

When the load resistance value is greater than or equal to the fourth reference resistance value K4 as a result of the comparison between the fourth reference resistance value K4 and the load resistance value that is calculated after the driving mode of the inverter circuit 208 is set to the full bridge mode, the main control circuit 20 limits the output power value of the working coil 210 to a value less than a predetermined reference power value. Accordingly, the main control circuit 20 changes the driving frequency of the inverter circuit 208 to a frequency value corresponding to the reference power value, and provides a control signal corresponding to the changed driving frequency to the inverter control circuit 22.

In step 728, when the load resistance value is less than the fourth reference resistance value K4, the driving mode of the inverter circuit 208 remains in the full bridge mode, and the main control circuit 20 performs step 802 described below.

Referring to FIG. 8, after step 708, 716, 724, 730 or 728 is performed, the main control circuit 20 obtains magnitude of output voltage of the DC link capacitor $C_1$, measured through the voltage measurement sensor 24, i.e., a current DC link voltage value. The main control circuit 20 calculates a current voltage value of the working coil 210, based on the current DC link voltage value (802). The main control circuit 20 may calculate the current voltage value of the working coil 210, based on [Equation 9] described hereunder.

$$VC1 = \frac{2\sqrt{2}}{\pi} \times \frac{1}{2} \times G_v \times VD1 \qquad \text{[Equation 9]}$$

In [Equation 9], VC1 denotes a current voltage value of the working coil 210, and VD1 denotes a current DC link voltage value. Additionally, Gv denotes a voltage gain value, and may be replaced with a value acquired through an experiment or a previously calculated value.

Then the main control circuit 20 calculates a load resistance value of a container, based on the working coil 210's current voltage value calculated in step 802, and the working coil 210's resonance current value measured through the second current measurement sensor 25 (804). The main control circuit 20 may calculate the load resistance value, based on [Equation 10] described hereunder.

$$I_r = \frac{1}{8} \frac{VC1}{nR_{pot}} \sqrt{\frac{2n^4 \times R_{pot}^2 \times T^2}{L_m^2} + 8\pi^2} \approx \frac{\sqrt{2}\pi}{4} \frac{VC1}{nR_{pot}} \qquad \text{[Equation 10]}$$

In [Equation 10], Ir denotes a resonance current value measured by the second current measurement sensor 25, and n denotes the number of windings of the working coil 210. Additionally, VC1 denotes the working coil 210's current voltage value calculated in step 802, and Rpot denotes a load resistance value. Further, Lm denotes the working coil 210's magnetizing inductance, and T denotes a switching cycle of the inverter circuit 208, i.e., a cycle in which the switching elements of the inverter circuit 208 are turned on/turned off. The main control circuit 20 can calculate a load resistance value Rpot by applying the resonance current value Ir measured by the second current measurement sensor 25, the working coil 210's current voltage value VC1 calculated in step 802, and the number n of windings of the working coil 210 to [Equation 10].

Then the main control circuit 20 calculates equivalent resistance values of the container and the working coil, based on the load resistance value calculated in step 804 and the number of windings of the working coil (806). Assuming that the container and the working coil are a single load, the equivalent resistance value is a resistance value of the single load. The main control circuit 20 can calculate the equivalent resistance value, based on [Equation 11] described hereunder.

$$R_{eq} = n^2 \times R_{pot} \qquad \text{[Equation 11]}$$

In [Equation 11], Req denotes an equivalent resistance value, and n denotes the number of windings of the working coil 210. Additionally, Rpot denotes the container's load resistance value calculated in step 804.

Then the main control circuit 20 calculates a target voltage value of the working coil 210, based on a required power value required of the working coil 210, corresponding to a heating level set by the user, and the equivalent resistance value calculated in step 806 (808). The main control circuit 20 can calculate the target voltage value, based on [Equation 12] described hereunder.

$$VC2 = \sqrt{P_{transfer} \times R_{eq}} \qquad \text{[Equation 12]}$$

In [Equation 12], VC2 denotes a target voltage value of the working coil 210. The main control circuit 20 controls magnitude of voltage supplied to the working coil 210 so that the magnitude of voltage can reach the target voltage value. Additionally, Ptransfer denotes a required power value of the working coil 210, and Req denotes the equivalent resistance value calculated in step 806.

Then the main control circuit 20 calculates a final voltage value of the DC link capacitor $C_1$, based on the working coil 210's target voltage value calculated in step 808 (810). The main control circuit 20 can calculate the final voltage value, based on [Equation 13] described hereunder.

$$VD2 = \frac{VC2 \times \pi}{G_v \times \sqrt{2}} \qquad \text{[Equation 13]}$$

In [Equation 13], VD2 denotes a final voltage value of the DC link capacitor $C_1$. Additionally, VC2 denotes the target voltage value calculated in step 808, and Gv denotes a voltage gain value.

As the final voltage value is calculated in step 810, the main control circuit 20 adjusts a duty ratio of a PFC driving signal $S_P$ output from the PFC control circuit 21, based on the calculated final voltage value. Accordingly, magnitude of voltage output from the PFC circuit 206 is adjusted, and a voltage value of voltage output from the DC link capacitor $C_1$ is adjusted to the final voltage value. Further, as the voltage value of the DC link voltage is adjusted to the final voltage value, an output power value of the working coil 210 reaches the required power value corresponding to the heating level set by the user.

In the present disclosure, the induction heating apparatus operates in various modes, depending on characteristics of a container, as described above. Thus, the induction heating apparatus can ensure a wider operation range, and when it comes to the induction heating apparatus, containers exhibiting various characteristics can be used.

Further, in the present disclosure, when the output power of working coil is adjusted, the voltage value of DC link capacitor is adjusted through the PFC circuit, instead of adjusting driving frequency of the induction heating apparatus. The induction heating apparatus according to the disclosure, which uses a method by which output power is adjusted based on adjustment of a voltage value of the DC link capacitor, ensures higher power efficiency and a wider power adjustment range than an induction heating apparatus of the related art, which uses a method by which output power is adjusted based on adjustment of a frequency.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. An induction heating apparatus, comprising:
   a rectifier circuit configured to rectify an alternating current (AC) input voltage supplied by a power source, and to output a rectified voltage;
   a power factor correction (PFC) circuit configured to be driven by a PFC driving signal, and to control and output power factors of the rectified voltage and an output current from the rectifier circuit;
   a direct current (DC) link capacitor configured to smooth a voltage output from the PFC circuit and to output a DC link voltage;

an inverter circuit comprising a first switching element, a second switching element, a third switching element, a fourth switching element, an inductor, and a variable capacitor circuit, and configured to be driven by an inverter driving signal and to convert the DC link voltage into an AC voltage for driving a working coil; and a main control circuit configured to:

determine a driving mode of the inverter circuit by sequentially changing a driving frequency of the inverter circuit from a first predetermined driving frequency to a subsequent predetermined driving frequency until a calculated load resistance value satisfies a predetermined reference resistance value, which includes:

calculating a load resistance value of a container placed on the working coil at each driving frequency, and comparing the load resistance value of the container with the predetermined reference resistance value;

adjust a capacitance of the variable capacitor circuit depending on the driving mode of the inverter circuit; and adjust a magnitude of the DC link voltage depending on a final voltage value calculated based on an equivalent resistance value that is a resistance value in which the load resistance of the container and a resistance of the working coil are added and a required power value of the working coil.

2. The induction heating apparatus of claim 1, wherein the main control circuit is configured to calculate a current voltage value of the working coil based on a current DC link voltage value, calculate the load resistance value of the container based on a current voltage value of the working coil and a resonance current value of the working coil, and calculate the equivalent resistance value based on the load resistance value of the container and a number of winds of the working coil.

3. The induction heating apparatus of claim 1, wherein the main control circuit is configured to calculate a target voltage value of the working coil based on the required power value of the working coil and the equivalent resistance value, and calculate the final voltage value based on the target voltage value.

4. The induction heating apparatus of claim 1, wherein the main control circuit is configured to adjust a duty ratio of the PFC driving signal so that the duty ratio corresponds to the final voltage value.

5. The induction heating apparatus of claim 1, wherein the PFC circuit comprises:

a boost inductor;

a diode connected in series with the boost inductor; and a boost switching element connected in parallel with a connection point between the boost inductor and the diode.

6. The induction heating apparatus of claim 1, wherein the main control circuit is configured to compare the load resistance value of the container with a predetermined reference resistance value, and based on results of the comparison, determine a driving mode of the inverter circuit.

7. The induction heating apparatus of claim 6, wherein the main control circuit is configured to set the driving mode to a three-fold frequency mode when the load resistance value of the container is less than a first predetermined reference resistance value in a state in which a driving frequency of the inverter circuit is set to the first predetermined driving frequency.

8. The induction heating apparatus of claim 7, wherein, in the three-fold frequency mode, the main control circuit is configured to adjust the capacitance of the variable capacitor circuit to be same as an equation below:

$$C_{r,t} = \frac{1}{(2\pi f_{r,t})^2 L_r}$$

where Cr,t denotes the capacitance of the variable capacitor circuit, fr,t denotes a frequency value that is three times greater than the driving frequency of the inverter circuit, and Lr denotes inductance of the inductor of the inverter circuit.

9. The induction heating apparatus of claim 6, wherein the main control circuit is configured to set the driving mode to a two-fold frequency mode when the load resistance value of the container is less than a second predetermined reference resistance value in a state in which a driving frequency of the inverter circuit is set to the first predetermined driving frequency.

10. The induction heating apparatus of claim 9, wherein, in the two-fold frequency mode, the main control circuit is configured to adjust the capacitance of the variable capacitor circuit to be same as an equation below:

$$C_{r,d} = \frac{1}{(2\pi f_{r,d})^2 L_r}$$

where Cr,d denotes the capacitance of the variable capacitor circuit, fr,d denotes a frequency value that is two times greater than the driving frequency of the inverter circuit, and Lr denotes inductance of the inductor of the inverter circuit.

11. The induction heating apparatus of claim 9, wherein, in the half bridge mode, the main control circuit is configured to adjust the capacitance of the variable capacitor circuit to be same as an equation below:

$$C_{r,h} = \frac{1}{(2\pi f_{r,h})^2 L_r}$$

where Cr,h denotes the capacitance of the variable capacitor circuit, fr,h denotes a frequency value that is same as the driving frequency of the inverter circuit, and Lr denotes inductance of the inductor of the inverter circuit.

12. The induction heating apparatus of claim 9, wherein, in the full bridge mode, the main control circuit is configured to adjust the capacitance of the variable capacitor circuit to be same as an equation below:

$$C_{r,f} = \frac{1}{(2\pi f_{r,f})^2 L_r}$$

where Cr,f denotes the capacitance of the variable capacitor circuit, fr,f denotes a frequency value that is same as the driving frequency of the inverter circuit, and Lr denotes inductance of the inductor of the inverter circuit.

13. The induction heating apparatus of claim 6, wherein the main control circuit is configured to set the driving mode to a half bridge mode when the load resistance value of the container is less than a third predetermined reference resistance value in a state in which a driving frequency of the inverter circuit is set to a third predetermined driving frequency.

14. The induction heating apparatus of claim 6, wherein the main control circuit is configured to set the driving mode to a full bridge mode when the load resistance value of the container is greater than or equal to a third predetermined reference resistance value in a state in which a driving frequency of the inverter circuit is set to a third predetermined driving frequency.

15. The induction heating apparatus of claim 14, wherein the main control circuit is configured to limit an output power value of the working coil to a value that is a predetermined reference power value or less, when the load resistance value of the container is greater than or equal to a fourth predetermined reference resistance value in a state in which the driving mode is set to a full bridge mode.

\* \* \* \* \*